United States Patent [19]

Kersting et al.

[11] Patent Number: 5,021,028
[45] Date of Patent: Jun. 4, 1991

[54] HARVESTER THRESHER WITH CHOPPER

[75] Inventors: Hermann Kersting, Oelde/Lette; Franz Piesch, Harsewinkel, both of Fed. Rep. of Germany

[73] Assignee: Claas Ohg, Harsewinkel, Fed. Rep. of Germany

[21] Appl. No.: 417,270

[22] Filed: Oct. 5, 1989

[30] Foreign Application Priority Data

Oct. 7, 1988 [DE] Fed. Rep. of Germany ....... 3834102

[51] Int. Cl.$^5$ .......................................... A01D 49/00
[52] U.S. Cl. ..................................... 460/85; 460/112; 56/500
[58] Field of Search ...................... 460/14, 13, 63, 85, 460/90, 111, 112, 901, 76, 77, 78; 56/500

[56] References Cited

U.S. PATENT DOCUMENTS

| | | | |
|---|---|---|---|
| 4,062,366 | 12/1977 | De Coene | 460/14 |
| 4,310,004 | 1/1982 | De Busscher et al. | 460/14 |
| 4,489,734 | 12/1984 | Van Overschelde | 460/81 |
| 4,628,946 | 12/1986 | De Busscher et al. | 460/78 |
| 4,884,993 | 12/1989 | Hemker et al. | 460/14 |

Primary Examiner—Terry Lee Melius
Attorney, Agent, or Firm—Michael J. Striker

[57] ABSTRACT

A harvester thresher has a housing, several straw shakers located after the threshing device having a discharge end, a threshing and separating device having two lateral product outlet openings, a chopper having two opposite ends, and passages each connected with a respective one of the product outlet openings of the threshing and separating device and having an end located above a respective one of the ends of the chopper.

7 Claims, 4 Drawing Sheets

HARVESTER THRESHER WITH CHOPPER

BACKGROUND OF THE INVENTION

The present invention relates generally to a harvester thresher.

More particularly, it relates to a harvester thresher which has a housing, a threshing device operating in accordance with the principle of a tangential flow system, straw shakers located after the threshing device, a threshing and separating device arranged at the outlet end of the straw shakers and operating in accordance with the principle of an axial flow system and also covering the width of the harvester thresher housing, and a chopper aggregate located after the threshing and separating device wherein a part of the housing of the threshing and separating device is turnable.

A harvester thresher of the above mentioned general type is disclosed, for example, in the German patent application P 37 35 669.0. Due to the arrangement of a threshing and separating device whose operation can be selectively accepted or not, the efficiency of a harvester thresher is increased in correspondence with respective working environments without an increased or additional grain loss. It has been determined from the praxis that such a harvester thresher has a disadvantage in that it does not satisfy the requirements applied to modern harvester thresher as to the post-treatment of the straw and its depositing on the field. For example, it is not possible to post-thresh the straw and deposit it on the field in a single windrow. As a result, the following bale press must cover a double path for taking the straw deposited in two windrows. Moreover, it is also not possible to chop agricultural products without post-threshing which is required for some types of fruits.

SUMMARY OF THE INVENTION

Accordingly, it is an object of the present invention to provide a harvester thresher of the above mentioned general type, which avoids the disadvantages of the prior art.

More particularly, it is an object of the present invention to provide a harvester thresher of the above mentioned type which can be utilized at many sides and can supply both product streams produced by the threshing and separating device to a joint chopper.

In keeping with these objects and with others which will become apparent hereinafter, one feature of the present invention resides, briefly stated, in a harvester thresher in which passages are provided, each connected with a respective one of lateral product outlet openings of the threshing and separating device and each having an end located above the end of the chopper.

When the harvester thresher is designed in accordance with the present invention it eliminates the disadvantages of the prior art and achieves the above specified objects.

In accordance with a further advantageous feature of the present invention, the bottom of each passage is inclined downwardly from the product outlet opening of the threshing and separating device to the chopper. It therefore extends inclinedly towards the chopper.

In accordance with still a further feature of the present invention, a turnable cover flap is associated with the chopper, so that the product can be selectively supplied either to the chopper or directly onto the field ground.

In accordance with a further feature of the present invention, the chopper has a width which corresponds to a total width of all straw shakers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
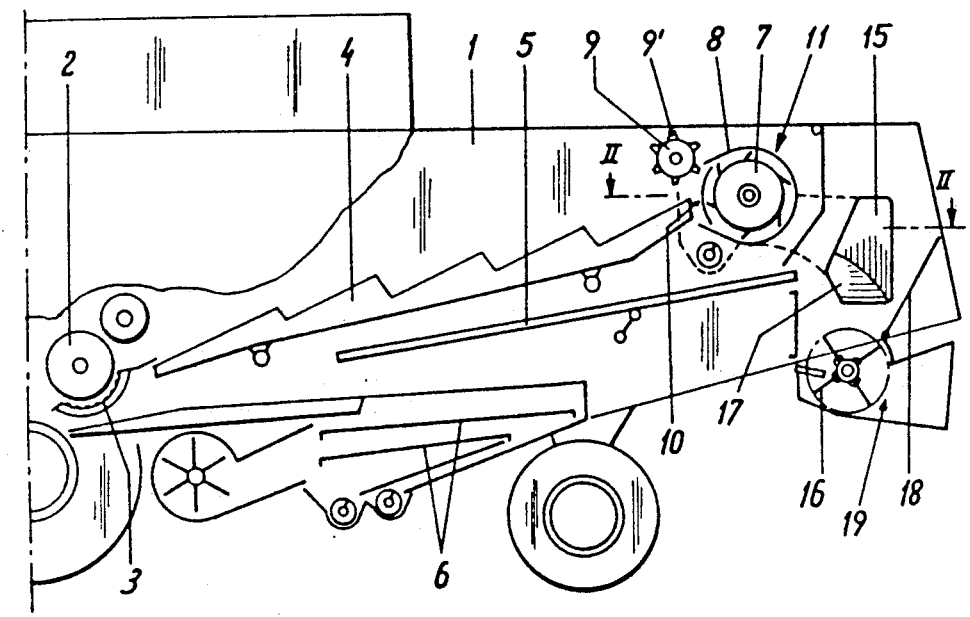
FIG. 1 is a side view of a harvester thresher in accordance with the present invention.

A harvester thresher in accordance with the present invention has a housing which is identified as a whole with reference numeral 1. The housing accommodates a threshing mechanism operating in accordance with the principle of tangential flow system and including a threshing drum 2 and a threshing basket 3, and also straw shakers 4 located after the threshing mechanism, a return bottom 5, and a sieve device 6. A threshing and separating device 11 is arranged after the straw shaker 4 and includes a rotor 7 and a housing 8. An introducing drum 9 with a driver 9' is located above the ends of the straw shaker 4 before a product inlet opening 10 of the axial threshing and separating device 11. The introducing drum 9 provides for safe transfer of agricultural products containing residual grains, from the shakers 4 to the threshing and separating device 11. Instead of the introducing drum 9, in the embodiments of FIGS. 3 and 4 the ends of the shaker 4 are provided with additional transporting elements disclosed for example in the German patent application P 38 14 036.5.

Figure 2:
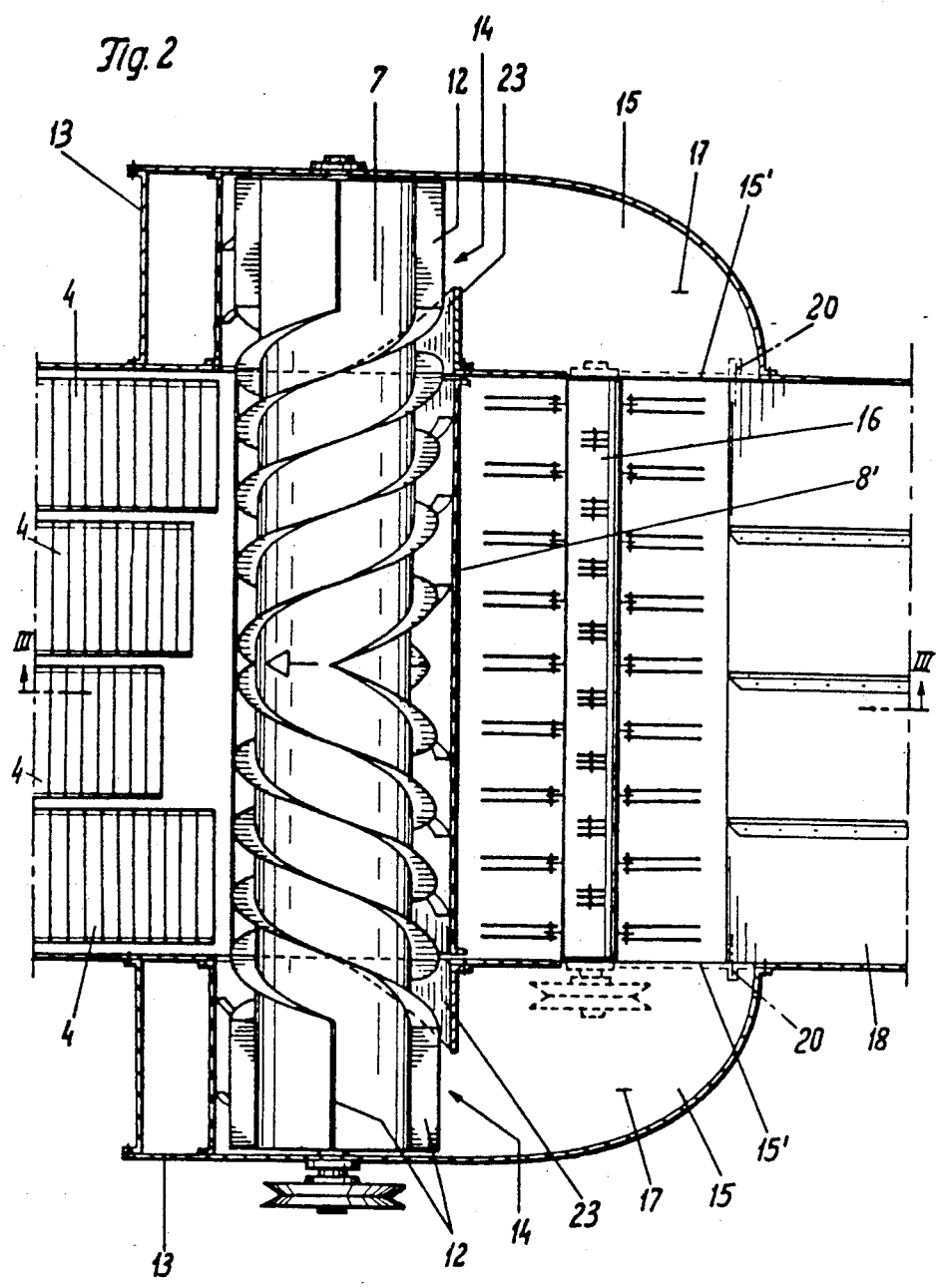
FIG. 2 is a plan view of a rear part of the harvester thresher without a hood.
Figure 3:
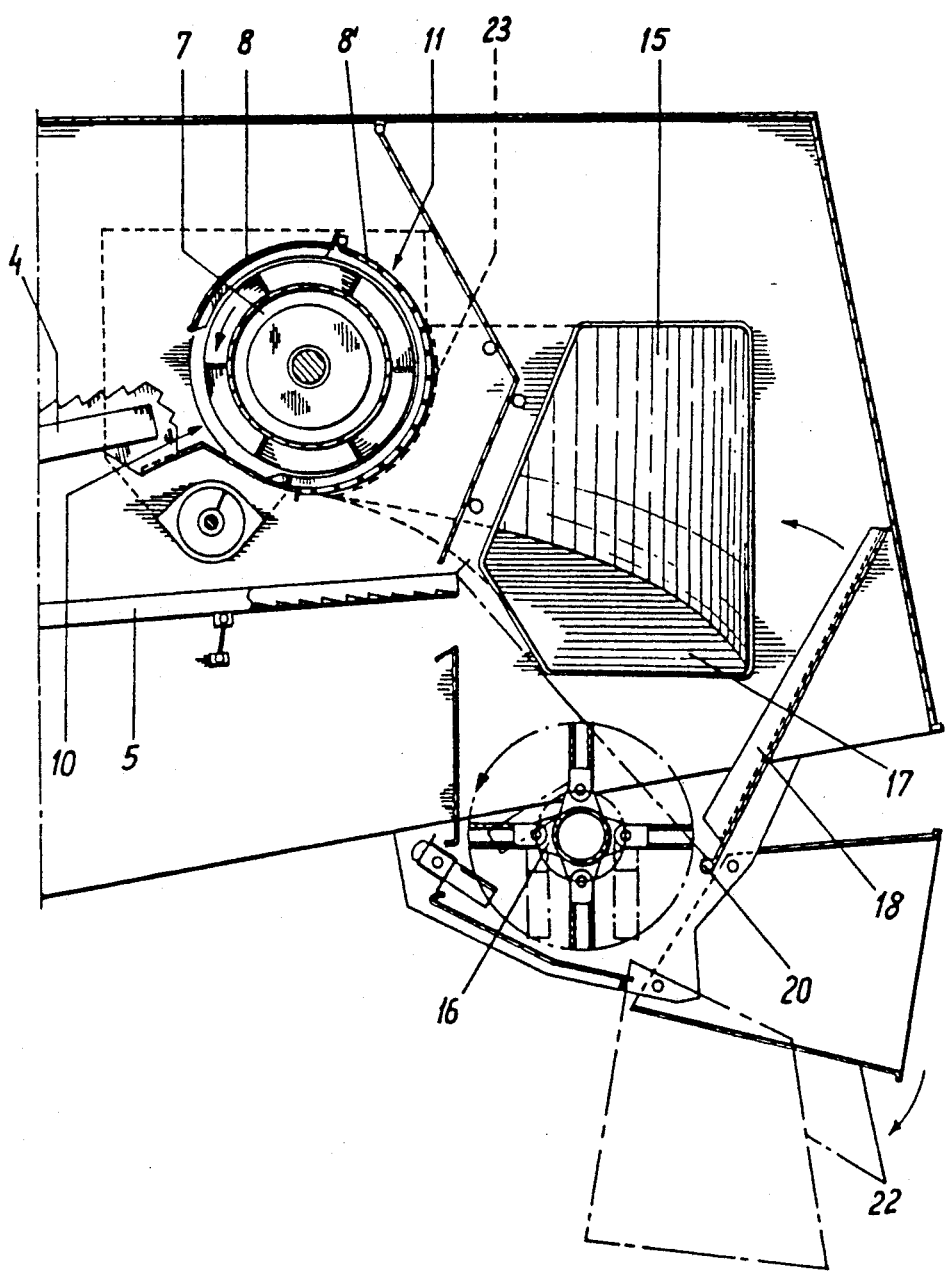
FIG. 3 is a view showing section of the inventive harvester thresher, taken along the line III—III in FIG. 2.
Figure 4:
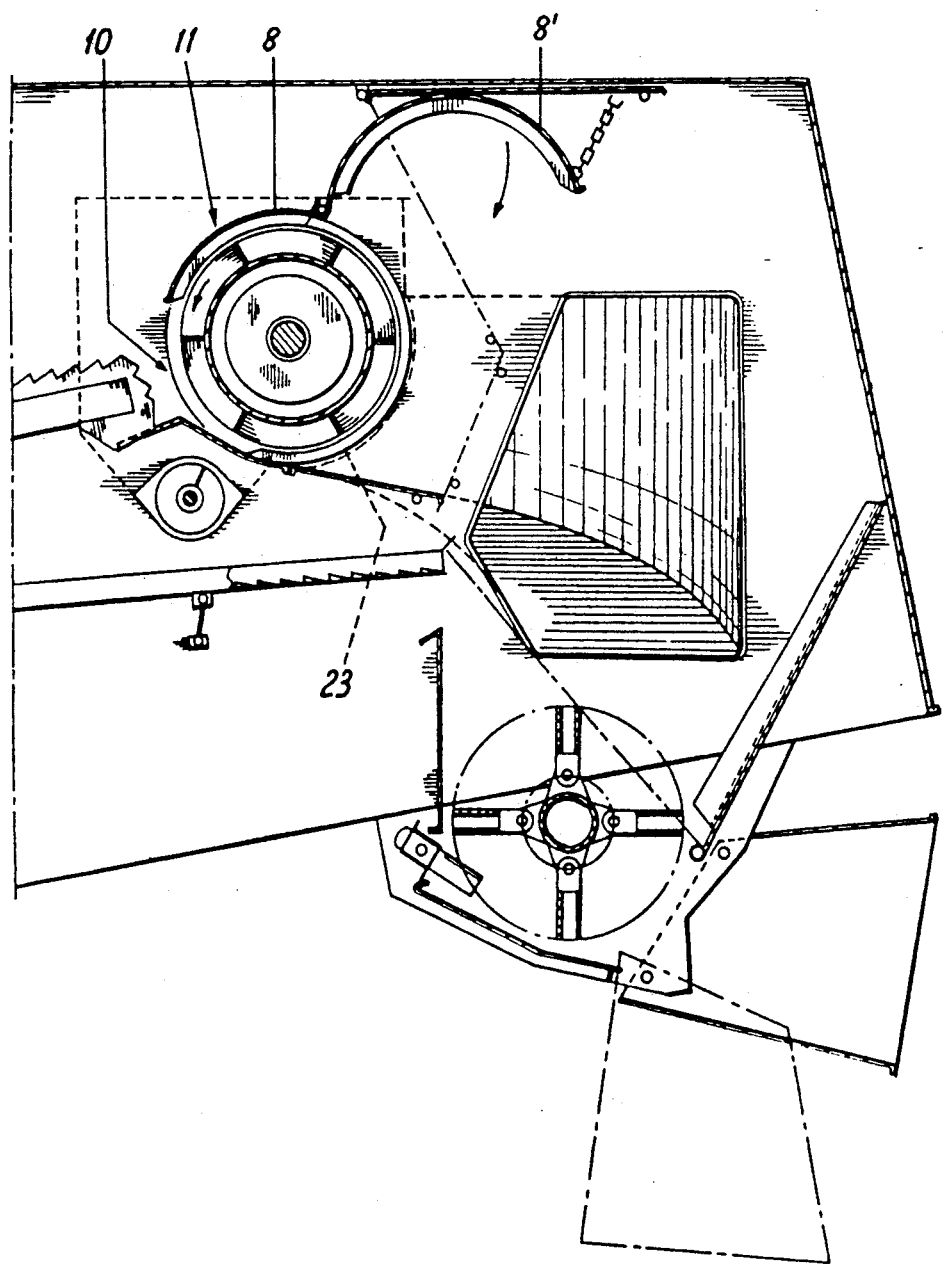
FIG. 4 is a view showing a part shown in FIG. 3, but in another position.

As can be seen from FIG. 2, the rotor 7 extends with its both ends outwardly beyond the housing 1. These outwardly extending rotor parts are provided with throwing scoops 12 and surrounded by a throw housing 13. The housing 13 has product outlet openings 14 connected with passages 15. Passages 15 have ends 15' which end above the ends of a chopper 16. A bottom 17 of the passage 15 is inclined downwardly, starting from the housing 13. The chopper 16 is located behind the axial threshing and separating device 11 and is arranged deeper than the latter. As can be seen from FIG. 2, the width of the chopper 16 corresponds to the total width of all straw shakers 4. As shown in FIGS. 3 and 4, a cover flap 18 is associated with the chopper 16 and can turn about an axis 20 to a position shown in dash-dot lines. When needed, the straw exiting the passages 15 can be supplied either to the chopper 16 in the position of the cover flap 18 shown in solid lines, or directly onto a field ground in the position of the cover flap 18 shown in dash-dot lines. For improving the guidance of the straw when it is chopped, a turnable product guiding hood 22 is associated with an outlet 19 of the chopper. During windrow depositing the product guiding hood 22 is turned to the position shown in dash-dot lines as can be seen from FIGS. 3 and 4.

FIG. 4 clearly shows that a segment 8' of the housing 8 can be turned upwardly so that the axial threshing and separating device 11 becomes inoperative. The straw coming from the straw shakers 4 will then be taken by the rotor 7 over approximately 45° of its periphery and then thrown along a guiding surface 21 from above either in the chopper 16 or onto the cover flap 18.

In order to insure that an especially long straw can be reliably transferred to the passages 15, additional wall parts 23 are provided. They corresponds to the diameter of the housing 8 and arranged at both ends of the housing 8, so that they widen starting from the housing bottom 17 and extend over the whole height of the outlet openings 14 of the housing.

It will be understood that each of the elements described above, or two or more together, may also find a useful application in other types of constructions differing from the types described above.

While the invention has been illustrated and described as embodied in a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher, comprising:
a threshing device; straw shakers located downstream said threshing device and having a discharge end; a threshing and separating device located downstream said straw shaker and having two lateral product outlet openings; a chopper having two opposite ends; and passages each having one end connected with a respective one of said product outlet openings of said threshing and separating device and another end located above a respective one of said ends of said chopper, each of said passages having a bottom which extends in a downwardly inclined manner from a respective one of said product outlet openings of said threshing and separating device to said chopper.

2. A harvester thresher as defined in claim 1, wherein said threshing and separating device has a housing with a turnable housing part.

3. A harvester thresher as defined in claim 1; and further comprising a turnable cover flap which is associated with said chopper and turnable between at least two positions so as to supply straw selectively either to said chopper or directly onto a field ground, respectively 4. A harvester thresher as defined in claim 1, wherein said threshing device is formed to operate with a tangential product flow, whereas said threshing and separating device is formed to operate in accordance with an axial product flow.

5. A harvester thresher as defined in claim 1, wherein said shakers have a predetermined total width, said chopper having a width substantially corresponding to the total width of said shakers.

6. A harvester thresher, comprising:
a threshing device; straw shakers located downstream said threshing device and having a discharge end; a threshing and separating device located downstream said straw shaker and having two lateral product outlet openings; a chopper having two opposite ends; and passages each having one end connected with a respective one of said product outlet openings of said threshing and separating device and another end located above a respective one of said ends of said chopper, said straw shakers having shaking surfaces with a predetermined total widths, said chopper has a width corresponding to said total widths of said shaking surfaces of said straw shakers.

7. A harvester thresher, comprising:
a threshing device; straw shakers located downstream said threshing device and having a discharge end; a threshing and separating device located downstream said straw shaker and having two lateral product outlet openings; a chopper having two opposite ends; and passages each having one end connected with a respective one of said product outlet openings of said threshing and separating device and another end located above a respective one of said ends of said chopper, said threshing and separating device having a housing of a predetermined diameter and having opposite ends and a bottom; and additional wall parts which correspond to said diameter of said housing and are arranged at both said ends of said housing so that they widen upwardly from said housing bottom and extend over a whole height of said product outlet openings.

* * * * *